United States Patent
Tang et al.

(10) Patent No.: US 11,748,191 B2
(45) Date of Patent: Sep. 5, 2023

(54) TECHNIQUES FOR ERROR CORRECTION AT A MEMORY DEVICE

(71) Applicant: Micron Technology, Inc., Boise, ID (US)

(72) Inventors: Li Hua Tang, Shanghai (CN); Qiao Hua Dong, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/515,033

(22) Filed: Oct. 29, 2021

(65) Prior Publication Data

US 2023/0135688 A1 May 4, 2023

(51) Int. Cl.
*G06F 11/10* (2006.01)
*G06F 11/30* (2006.01)
*G06F 11/07* (2006.01)

(52) U.S. Cl.
CPC ........ *G06F 11/1068* (2013.01); *G06F 11/0772* (2013.01); *G06F 11/1048* (2013.01); *G06F 11/3037* (2013.01)

(58) Field of Classification Search
CPC .............. G06F 11/1068; G06F 11/0772; G06F 11/1048; G06F 11/3037
See application file for complete search history.

(56) References Cited

U.S. PATENT DOCUMENTS

| | | | | |
|---|---|---|---|---|
| 4,381,540 | A * | 4/1983 | Lewis et al. | G06F 11/0772 714/45 |
| 2004/0193796 | A1* | 9/2004 | Takamoto et al. | G06F 3/0689 711/113 |
| 2019/0095264 | A1* | 3/2019 | Tsern et al. | G06F 11/0745 |
| 2020/0034228 | A1* | 1/2020 | Pawlowski | G06F 11/1004 |
| 2021/0181990 | A1* | 6/2021 | Balb et al. | G06F 3/0679 |

\* cited by examiner

*Primary Examiner* — Guy J Lamarre
(74) *Attorney, Agent, or Firm* — Holland & Hart LLP

(57) ABSTRACT

Methods, systems, and devices for techniques for error correction at a memory device are described. In some examples, as part of transmitting a command to access data stored at a memory device, a host device may transmit a combined error control code to the memory device that may be generated using the command and associated inversion information. The memory device may use the received combined error control code to perform an error control procedure on both the command and the inversion information. In some examples, while in a direct link error control code procedure mode, the host system may transmit a command to access data stored at the memory device. The host system may use a same pin or channel to transmit both an error control code for the command and an error control code for the associated data.

20 Claims, 8 Drawing Sheets

TECHNIQUES FOR ERROR CORRECTION AT A MEMORY DEVICE

FIELD OF TECHNOLOGY

The following relates generally to one or more systems for memory and more specifically to techniques for error correction at a memory device.

BACKGROUND

Memory devices are widely used to store information in various electronic devices such as computers, user devices, wireless communication devices, cameras, digital displays, and the like. Information is stored by programing memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read, or sense, at least one stored state in the memory device. To store information, a component may write, or program, the state in the memory device.

Various types of memory devices and memory cells exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, and others. Memory cells may be volatile or non-volatile. Non-volatile memory, e.g., FeRAM, may maintain their stored logic state for extended periods of time even in the absence of an external power source. Volatile memory devices, e.g., DRAM, may lose their stored state when disconnected from an external power source.

DETAILED DESCRIPTION

Figure 1:
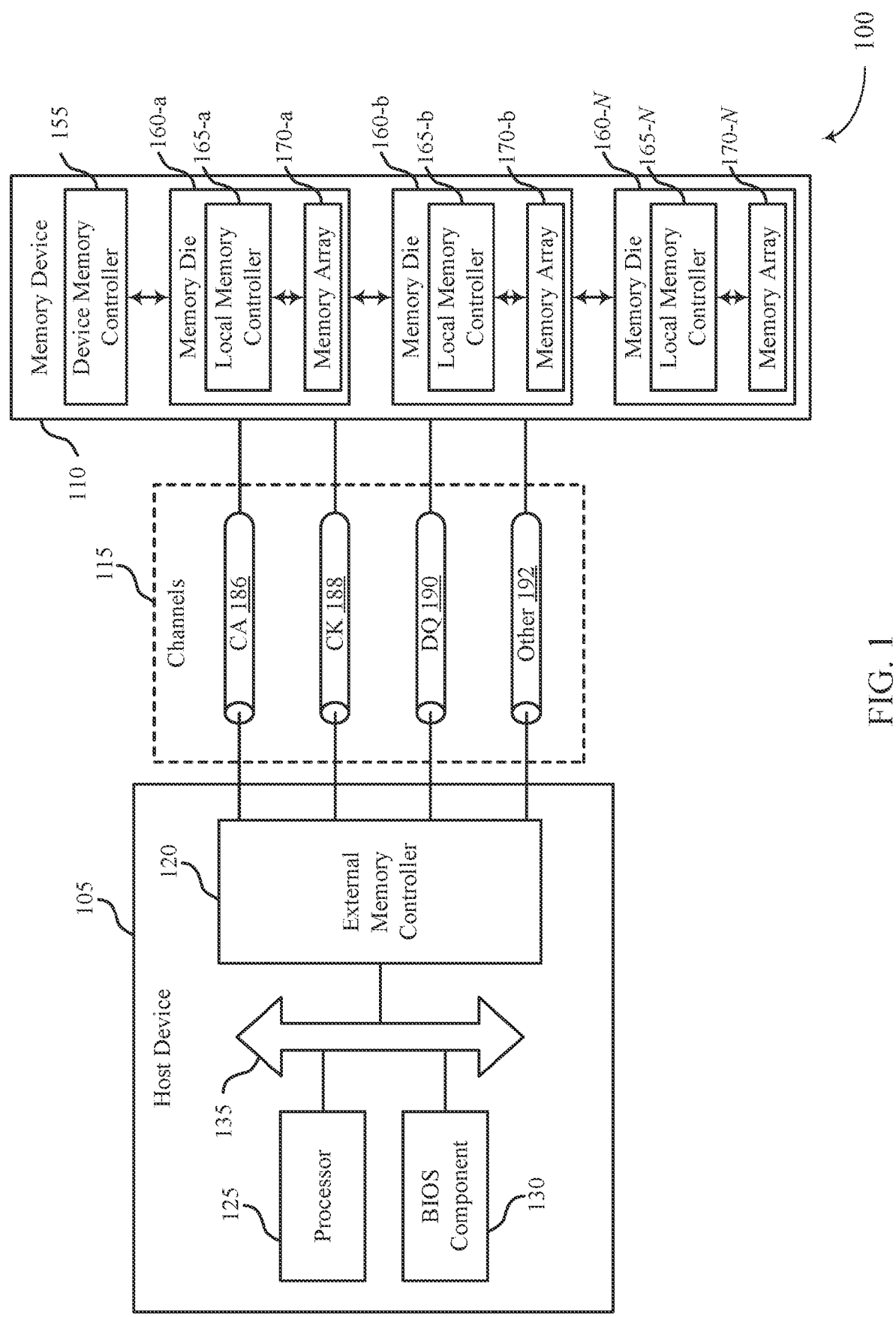
FIG. 1 illustrates an example of a system that supports techniques for error correction at a memory device in accordance with examples as disclosed herein.

Some memory systems, such as DRAM systems, may receive commands (e.g., write commands, read commands, or erase commands) from a host system for accessing or programming data at a memory device. In some cases, the host system may also transmit error control codes, such as error correction codes (ECC) or write parity for a command, which may allow the memory device to determine whether the command was received correctly. In some cases, the command may include 14 bits, while the write parity may include a single bit. Additionally, the host system may transmit inversion information, such as data mask inversion (DMI) information associated with the command, as well as error control codes for the inversion information. In some cases, the inversion information may include 16 bits, while the ECC associated with the inversion information may include 6 bits. The memory device may perform an error control procedure on the command using the write parity bit for the command. However, the error control procedure may be configured to detect a single error in the command, and may not be configured to detect multiple errors or to correct errors (e.g., the write parity may be configured for an even/odd parity check). Techniques to efficiently detect multiple errors, correct errors, or both associated with the command are desired.

As described herein, the host system may generate a combined error correction code for both a command, such as a write command, and inversion information to transmit to the memory device. For example, the host system may include an ECC generator, which may use the command and the inversion information to generate an error control code for both the command and the inversion information. The host system may transmit the command to the memory device. After a delay (in some cases), the host system may also transmit the inversion information and the combined ECC for the command and the inversion data to the memory device. The memory device may use an error control code engine to perform an error correction procedure on both the command and the inversion information using the combined ECC. Because the combined ECC uses a larger number of bits than either the ECC for the command or the ECC for the inversion information, the error correction procedure may be able to both detect and correct errors in both the command and the inversion information.

Some memory systems, such as DRAM systems, may support a direct link error correction code procedure (DLEP) mode to protect data sent between a memory system and a host system. For example, while in the DLEP mode, the host system may transmit a command for accessing data and the associated data to the memory system (e.g., a write command). Additionally, the host system may generate an error control code for the command, such as a write parity code, as well as an error control code for the data to be transmitted to the memory system. While in the DLEP mode, the data associated with the command, as well as the error control code for the data, may be transmitted to the memory system and stored in an array of the memory system. If the memory system receives another command (e.g., a read command) for accessing the stored data, the memory system may transmit the data and the error control code for the data to the host system. The host system may perform an error control procedure on the data using the error control code stored at the memory system. In some cases, the error control code for the data may be transferred over a different channel than the error control code for the command. For example, while in the DLEP mode, the error control code for the data may be transferred over a channel used for inversion information, such as a DMI channel (e.g., a data mask inversion channel), which may not allow the host system and the memory system to use the channel for other signaling. For example, while in the DLEP mode, the host system may not be able to transfer inversion information, such as DMI, or bus inversion information, such as data bus inversion (DBI). Techniques to improve channel usage efficiency are desired.

As described herein, the host system and the memory system may use a same channel to transfer both an error control code for a command and an error control code for associated data while in a DLEP mode. For example, while in the DLEP mode, the host system may use a read data strobe (error control) channel to transmit both the error control code for the command and the error control code for the associated data, instead of using a second channel, such as the DMI channel, to transmit the error control code for the associated data. Thus, while in the DLEP mode, the second channel may be used to transfer other data or signals. For example, the second channel may be used to transfer DBI information. Additionally or alternatively, the second channel may be disabled while in the DLEP mode. Disabling the second channel while in the DLEP made may improve system efficiency by reducing power consumption and overhead associated with keeping the second channel active. Thus, techniques as described herein to use a same channel to transfer both the error control code for the command and the error control code for the associated data while in a DLEP mode may improve efficiency and communication quality.

Features of the disclosure are initially described in the context of systems and dies as described with reference to FIG. 1. Features of the disclosure are described in the context block diagrams and timing diagrams as described with reference to FIGS. 2-5. These and other features of the disclosure are further illustrated by and described with reference to an apparatus diagram and flowcharts that relate to techniques for error correction at a memory device as described with reference to FIGS. 6-8.

FIG. 1 illustrates an example of a system 100 that supports techniques for error correction at a memory device in accordance with examples as disclosed herein. The system 100 may include a host device 105, a memory device 110, and a plurality of channels 115 coupling the host device 105 with the memory device 110. The system 100 may include one or more memory devices 110, but aspects of the one or more memory devices 110 may be described in the context of a single memory device (e.g., memory device 110).

The system 100 may include portions of an electronic device, such as a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory device 110 may be a component of the system operable to store data for one or more other components of the system 100.

At least portions of the system 100 may be examples of the host device 105. The host device 105 may be an example of a processor or other circuitry within a device that uses memory to execute processes, such as within a computing device, a mobile computing device, a wireless device, a graphics processing device, a computer, a laptop computer, a tablet computer, a smartphone, a cellular phone, a wearable device, an internet-connected device, a vehicle controller, a system on a chip (SoC), or some other stationary or portable electronic device, among other examples. In some examples, the host device 105 may refer to the hardware, firmware, software, or a combination thereof that implements the functions of an external memory controller 120. In some examples, the external memory controller 120 may be referred to as a host or a host device 105.

A memory device 110 may be an independent device or a component that is operable to provide physical memory addresses/space that may be used or referenced by the system 100. In some examples, a memory device 110 may be configurable to work with one or more different types of host devices. Signaling between the host device 105 and the memory device 110 may be operable to support one or more of: modulation schemes to modulate the signals, various pin configurations for communicating the signals, various form factors for physical packaging of the host device 105 and the memory device 110, clock signaling and synchronization between the host device 105 and the memory device 110, timing conventions, or other factors.

The memory device 110 may be operable to store data for the components of the host device 105. In some examples, the memory device 110 may act as a secondary-type or dependent-type device to the host device 105 (e.g., responding to and executing commands provided by the host device 105 through the external memory controller 120). Such commands may include one or more of a write command for a write operation, a read command for a read operation, a refresh command for a refresh operation, or other commands.

The host device 105 may include one or more of an external memory controller 120, a processor 125, a basic input/output system (BIOS) component 130, or other components such as one or more peripheral components or one or more input/output controllers. The components of the host device 105 may be coupled with one another using a bus 135.

The processor 125 may be operable to provide control or other functionality for at least portions of the system 100 or at least portions of the host device 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or a combination of these components. In such examples, the processor 125 may be an example of a central processing unit (CPU), a graphics processing unit (GPU), a general purpose GPU (GPGPU), or an SoC, among other examples. In some examples, the external memory controller 120 may be implemented by or be a part of the processor 125.

The BIOS component 130 may be a software component that includes a BIOS operated as firmware, which may initialize and run various hardware components of the system 100 or the host device 105. The BIOS component 130 may also manage data flow between the processor 125 and the various components of the system 100 or the host device 105. The BIOS component 130 may include a program or software stored in one or more of read-only memory (ROM), flash memory, or other non-volatile memory.

The memory device 110 may include a device memory controller 155 and one or more memory dies 160 (e.g., memory chips) to support a desired capacity or a specified capacity for data storage. Each memory die 160 (e.g., memory die 160-*a*, memory die 160-*b*, memory die 160-N) may include a local memory controller 165 (e.g., local memory controller 165-*a*, local memory controller 165-*b*, local memory controller 165-N) and a memory array 170 (e.g., memory array 170-*a*, memory array 170-*b*, memory array 170-N). A memory array 170 may be a collection (e.g., one or more grids, one or more banks, one or more tiles, one or more sections) of memory cells, with each memory cell being operable to store at least one bit of data. A memory device 110 including two or more memory dies 160 may be referred to as a multi-die memory or a multi-die package or a multi-chip memory or a multi-chip package.

The memory die 160 may be an example of a two-dimensional (2D) array of memory cells or may be an example of a three-dimensional (3D) array of memory cells. A 2D memory die 160 may include a single memory array 170. A 3D memory die 160 may include two or more memory arrays 170, which may be stacked on top of one another or positioned next to one another (e.g., relative to a substrate). In some examples, memory arrays 170 in a 3D memory die 160 may be referred to as decks, levels, layers, or dies. A 3D memory die 160 may include any quantity of stacked memory arrays 170 (e.g., two high, three high, four high, five high, six high, seven high, eight high). In some 3D memory dies 160, different decks may share at least one common access line such that some decks may share one or more of a word line, a digit line, or a plate line.

The device memory controller 155 may include circuits, logic, or components operable to control operation of the memory device 110. The device memory controller 155 may include the hardware, the firmware, or the instructions that enable the memory device 110 to perform various operations and may be operable to receive, transmit, or execute commands, data, or control information related to the components of the memory device 110. The device memory controller 155 may be operable to communicate with one or more of the external memory controller 120, the one or more memory dies 160, or the processor 125. In some examples, the device memory controller 155 may control operation of the memory device 110 described herein in conjunction with the local memory controller 165 of the memory die 160.

In some examples, the memory device 110 may receive data or commands or both from the host device 105. For example, the memory device 110 may receive a write command indicating that the memory device 110 is to store data for the host device 105 or a read command indicating that the memory device 110 is to provide data stored in a memory die 160 to the host device 105.

A local memory controller 165 (e.g., local to a memory die 160) may include circuits, logic, or components operable to control operation of the memory die 160. In some examples, a local memory controller 165 may be operable to communicate (e.g., receive or transmit data or commands or both) with the device memory controller 155. In some examples, a memory device 110 may not include a device memory controller 155, and a local memory controller 165 or the external memory controller 120 may perform various functions described herein. As such, a local memory controller 165 may be operable to communicate with the device memory controller 155, with other local memory controllers 165, or directly with the external memory controller 120, or the processor 125, or a combination thereof. Examples of components that may be included in the device memory controller 155 or the local memory controllers 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, or various other circuits or controllers operable for supporting described operations of the device memory controller 155 or local memory controller 165 or both.

The external memory controller 120 may be operable to enable communication of one or more of information, data, or commands between components of the system 100 or the host device 105 (e.g., the processor 125) and the memory device 110. The external memory controller 120 may convert or translate communications exchanged between the components of the host device 105 and the memory device 110. In some examples, the external memory controller 120 or other component of the system 100 or the host device 105, or its functions described herein, may be implemented by the processor 125. For example, the external memory controller 120 may be hardware, firmware, or software, or some combination thereof implemented by the processor 125 or other component of the system 100 or the host device 105. Although the external memory controller 120 is depicted as being external to the memory device 110, in some examples, the external memory controller 120, or its functions described herein, may be implemented by one or more components of a memory device 110 (e.g., a device memory controller 155, a local memory controller 165) or vice versa.

The components of the host device 105 may exchange information with the memory device 110 using one or more channels 115. The channels 115 may be operable to support communications between the external memory controller 120 and the memory device 110. Each channel 115 may be examples of transmission mediums that carry information between the host device 105 and the memory device. Each channel 115 may include one or more signal paths or transmission mediums (e.g., conductors) between terminals associated with the components of the system 100. A signal path may be an example of a conductive path operable to carry a signal. For example, a channel 115 may include a first terminal including one or more pins or pads at the host device 105 and one or more pins or pads at the memory device 110. A pin may be an example of a conductive input or output point of a device of the system 100, and a pin may be operable to act as part of a channel.

Channels 115 (and associated signal paths and terminals) may be dedicated to communicating one or more types of information. For example, the channels 115 may include one or more command and address (CA) channels 186, one or more clock signal (CK) channels 188, one or more data (DQ) channels 190, one or more other channels 192, or a combination thereof. In some examples, signaling may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols (e.g., signal levels) of a signal may be registered for each clock cycle (e.g., on both a rising edge and a falling edge of a clock signal).

In some examples, CA channels 186 may be operable to communicate commands between the host device 105 and the memory device 110 including control information associated with the commands (e.g., address information). For example, commands carried by the CA channel 186 may include a read command with an address of the desired data. In some examples, a CA channel 186 may include any quantity of signal paths to decode one or more of address or command data (e.g., eight or nine signal paths).

In some examples, data channels 190 may be operable to communicate one or more of data or control information between the host device 105 and the memory device 110. For example, the data channels 190 may communicate information (e.g., bi-directional) to be written to the memory device 110 or information read from the memory device 110.

The channels 115 may include any quantity of signal paths (including a single signal path). In some examples, a channel 115 may include multiple individual signal paths. For example, a channel may be x4 (e.g., including four signal paths), x8 (e.g., including eight signal paths), x16 (including sixteen signal paths), etc.

In some examples, the one or more other channels 192 may include one or more error detection code (EDC) channels. The EDC channels may be operable to communicate error detection signals, such as checksums, to improve system reliability. An EDC channel may include any quantity of signal paths.

In some examples, as part of transmitting a command, such as a write command, to access data stored at the memory device 110, the host device 105 may transmit a combined error control code to the memory device 110. The combined error control code may be generated by an error control engine or generator at the host device 105 using the command and associated inversion information. The memory device 110 may use the received combined error control code to perform an error control procedure, such as a SECDED procedure, on both the command and the inversion information.

In some examples, while in a DLEP mode, the host device 105 may transmit a command, such as a write command, to access data stored at the memory device 110. The host system may use a same pin or channel 115 to transmit both an error control code for the command and an error control code for the associated data. While in the DLEP mode, the memory device 110 may store the error control code for the data in a memory array 170 different than a memory array 170 used to store the data. In some cases, the host device 105 may issue a read command for the data. In such cases, the memory device 110 may retrieve and transmit to the host device 105 both the data and the error control code for the data. The host device 105 may perform an error control procedure on the data using the error control code for the data.

Figure 2:
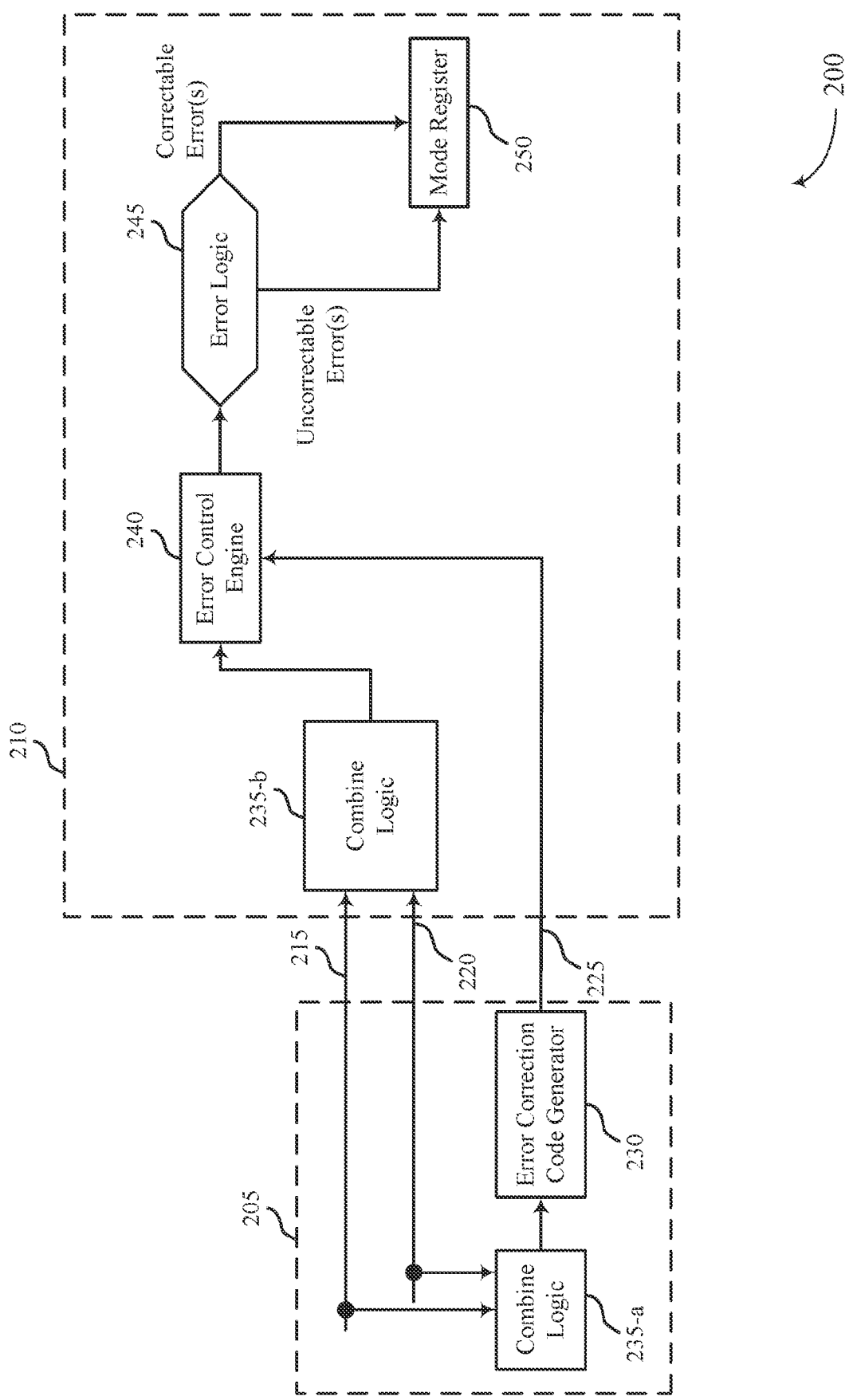
FIG. 2 illustrates an example of a block diagram that supports techniques for error correction at a memory device in accordance with examples as disclosed herein.

FIG. 2 illustrates an example of a block diagram 200 that supports techniques for error correction at a memory device in accordance with examples as disclosed herein. The block diagram 200 may include a host system 205 and a memory device 210, which may be examples of the host device 105 and memory device 110 described with reference to FIG. 1, respectively. The memory device 210 may be configured to receive a command for accessing data stored at the memory device 210, such as a write command, from the host system 205 using a command channel 215. Additionally, the memory device 210 may be configured to receive inversion information associated with the command from the host system 205 using the inversion channel 220. The inversion information may be an example of DMI, which may be used to indicate whether portions of data associated with the command received from the host system 205 may be inverted. In some cases, the memory device 210 may include a controller (not shown) which may oversee and route various signals and data received and transmitted over channels connecting the memory device 210 and the host system 205.

The memory device 210 may also receive error control codes, such as error correction codes or error detection codes associated with commands or inversion information received over the command channel 215 and the inversion channel 220, from the host system 205 using the error control channel 225. The command channel 215, the inversion channel 220, and the error control channel 225 may be examples of conductive paths or contacts between the host system 205 and the memory device 210.

As part of transmitting a command for accessing the memory device 210, the host system 205 may generate an error control code for the inversion information and transmit the error control code to the memory device 210 over the error control channel 225. In some cases, the error control code for the inversion information may include six bits. The memory device 210 may perform an error control procedure on the inversion information, such as single error correction double error detection (SECDED) procedure (or other error control or detection procedure), using the error control code to detect or correct one or more errors in the inversion information. The number of bits in the error control code may enable the memory device 210 to detect and/or correct errors in the inversion information.

Additionally or alternatively, as part of transmitting the command, the host system may generate an error control code, such as a write parity bit, for the command. In some cases, the error control code for the command may include a single bit. After transmitting the command to the memory device 210, the host system 205 may transmit the error control code to the memory device 210. The memory device 210 may perform an error control procedure on the command, such as a single error detection (SED) procedure, using the error control code to detect an error in the command. However, if the error control code includes no more than one bit, the error control procedure may not be able to detect more than one error, and may not be able to correct any errors in the command.

In some cases, the host system may generate an error control code for a combined set of information that includes both the command and the inversion information. For example, the host system 205 may combine (e.g., concatenate) the command and the inversion information and generate a single error control code using the combined command and inversion information. In some examples, the host system 205 route the command and the inversion information to combine logic 235-a to combine the two different sets of information into a single input for an error control code generator 230, which may generate the combined error control code. In some cases, the combined error control code may include seven bits for the combined set of information, which is more than the single bit associated with the parity for the command and the six bits associated with the error control code for the inversion information). The host system 205 may then transmit the combined error control code over the error control channel 225 to the memory device 210.

After receiving the command (e.g., over the command channel 215) from the host system 205, the memory device 210 may wait for a duration (e.g., a write latency) prior to receiving the data associated with the command, the inversion information (e.g., over the inversion channel 220), and the combined error control code. In some cases, the memory device may store the command during the duration in a buffer. After the duration, the host system 205 may transmit the data associated with the command, as well as the inversion information. In some cases, the data, the inversion information, or both may be transmitted as part of a boosted mode, such as a write burst mode.

In order to validate the received inversion information and command, the memory device 210 may perform an error control procedure. For example, the memory device may combine (e.g., concatenate) the command and the inversion information using a combine logic 235-b. The combine logic 235-b may transfer the combined command and inversion information to an error control engine 240. Additionally or alternatively, the memory device 210 may transfer the combined error control code to the error control engine.

As part of the error control procedure, the error control engine 240 may generate a second error control code using the combined command and inversion information. For example, the error control engine 240 may use the same error control procedure used by the error control code generator 230 to generate the second error control. The error control engine 240 may compare the generated second error control code to the received error control code by determining whether the two codes are the same. In some cases, the error control procedure may be configured to both correct an error associated with the command and inversion information, or to detect multiple errors. For example, the error control procedure may be an example of a SECDED procedure.

In some cases, the error control engine 240 may not detect any errors associated with the command and inversion information, or may detect a quantity of errors that are correctable by the error control procedure. For example, the error control engine 240 may determine that the received combined error control code and the second error control code match while in the error control procedure, and thus the command and inversion information were successfully received from the host system 205. In such cases, an error logic 245 may determine that the memory device 210 may perform the command, for example by programming data associated with the command in a memory array of the memory device 210. Additionally or alternatively, the error control engine 240 may detect a single error in the combined command and inversion information by detecting a mismatch between the received combined error control code and the second error control code. In such cases, the error control engine 240 may correct the error, for example by determining the location of the error using one or more bits of the received combined error control code and the second error control code. Subsequently, the error logic 245 may determine that memory device 210 may perform the command. In some cases, the error logic 245 may set a flag of a mode register 250 indicating that the command and the inversion information were successfully received.

Additionally or alternatively, the error control engine 240 may detect a quantity of errors (e.g., at least two errors) that are uncorrectable by the error control procedure, or the error control engine 240 may detect an uncorrectable error (e.g., an error which may not be correctable by a SECDED procedure). In such cases, the memory device 210 may set a flag, for example using the error logic 245, of a mode register 250 indicating that the error control procedure detected one or more uncorrectable errors.

In some cases, the memory device 210 may transmit an indication to the host system 205 to check the status (e.g., the flag) of the mode register 250. For example, the memory device 210 may transmit the indication as part of performing a read command. The status of the mode register 250 may indicate which bit of the command and inversion information contained an error. In some cases, after the host system 205 has checked the status of the mode register 250, the host system 205 may determine that an error in the command and inversion information may have been caused by a weak input of a bus or channel, such as the command channel 215, the inversion channel 220, or the error control channel 225. Thus, the host system 205 may adjust one or more parameters of contacts between the host system 205 and the memory device 210 to improve system performance. For example, the host system 205 may perform command bus training (CBT) to adjust a reference voltage of the contacts (e.g., one or more of the command channel 215, the inversion channel 220, the error control channel 225, or any other channel between the memory device 210 and the host system 205) to improve the accuracy of data or signals transmitted over the contacts.

By combining the command error control code and the inversion error control code using the error control code generator 230 and performing the error control procedure on the combined command and inversion information, the memory device 210 may be able to correct an error associated with the command. Correcting an error in the command may increase system performance and reliability, for example by improving the ability of the memory device 210 to accurately receive and perform access commands from the host system 205.

Figure 3:
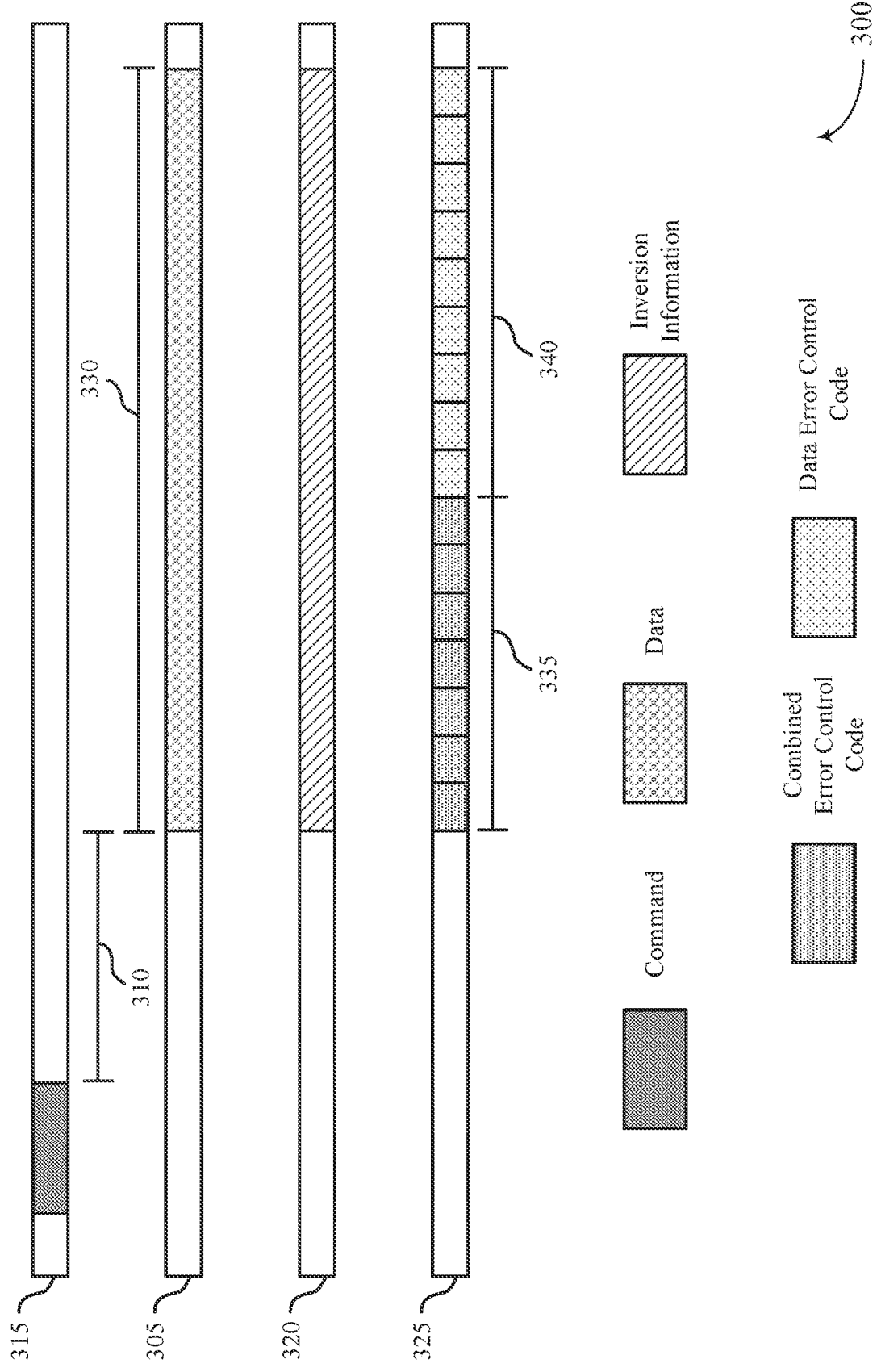
FIG. 3 illustrates an example of a timing diagram that supports techniques for error correction at a memory device in accordance with examples as disclosed herein.

FIG. 3 illustrates an example of a timing diagram 300 that supports techniques for error correction at a memory device in accordance with examples as disclosed herein. The timing diagram 300 may illustrate the timing and relative size of signals transmitted between a host system and a memory device, such as the host system 205 and the memory device 210 described with reference to FIG. 2. The timing diagram 300 may include signals sent over one or more channels, such as a command channel 315, a data channel 305, an inversion channel 320, and an error control channel 325. The timing diagram 300 may illustrate an example of signals transmitted as part of an access command, such as a write command, that include a combined error correcting code for the command and inversion information transmitted as part of performing the command.

By way of example, the host system may first transmit a command to the memory device over the command channel 315. Prior to transmitting some signals associated with the command, such as data, inversion information, or error correcting codes, the host system may wait for a duration 310 (e.g., there may latency between the command and associated signals). During the duration 310, the memory device may store the command in a buffer.

After the duration 310, the host system may transmit one or more signals associated with the command to the memory device. For example, the host system may transmit the data associated with the command during a burst mode 330 over the data channel 305 (e.g., the data may be an example of burst data). Additionally or alternatively, after the duration 310, the host system may transmit inversion information associated with the data.

Additionally, after the duration 310, the host system may transmit one or more error control codes to the memory device over the error control channel 325. The one or more error control codes may include a combined error control code 335 for the command and the inversion information, as well as a data error control code 340 for the data transmitted during the burst mode 330. The data error control code 340 may be an example of an error control code for data transmitted over the data channel 305.

In some examples, an error control code for the inversion information may include six bits, while the inversion information may include 16 bits, which may allow for an error control procedure to detect or correct at least one error in the inversion information. In some examples, an error control code for the command may include a single bit, while the command may include 14 bits, which may allow for an error control procedure to detect a single error without correcting the error in the command.

Additionally or alternatively, the error control code for the inversion information may be expanded by one bit to additionally cover the command (e.g., the error control code may include an additional bit to the six bits, such that the error control code becomes a combined error control code for the inversion information and the command). The combined error control code may thus include seven bits, which may allow for an error control procedure to detect or correct at least one error in the combined inversion information and command.

Figure 4:
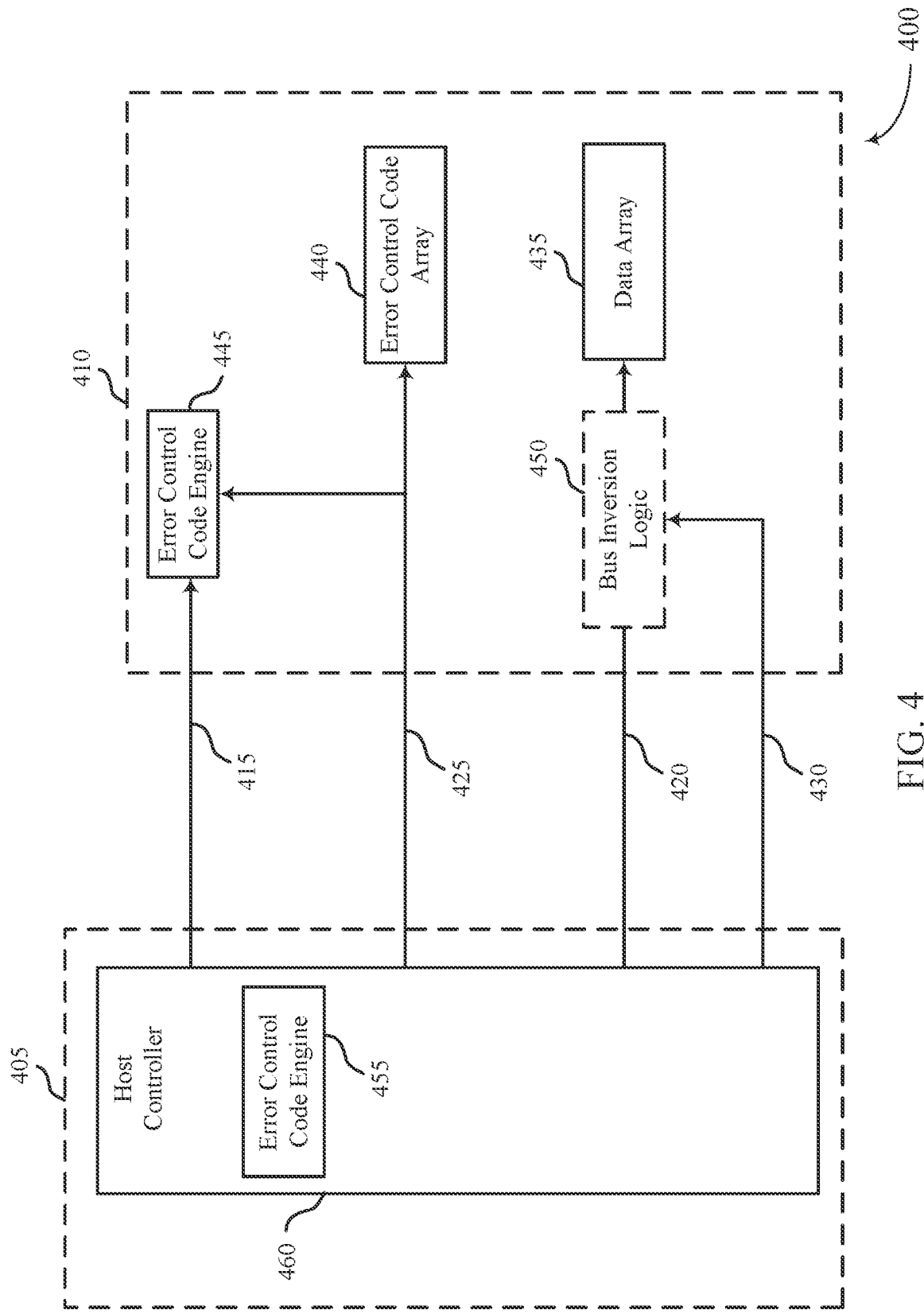
FIG. 4 illustrates an example of a block diagram that supports techniques for error correction at a memory device in accordance with examples as disclosed herein.

FIG. 4 illustrates an example of a block diagram 400 that supports techniques for error correction at a memory device in accordance with examples as disclosed herein. The block diagram 400 may include a host system 405 and a memory device 410, which may be examples of the host device 105 and memory device 110 described with reference to FIG. 1, respectively. The memory device 410 may be configured to receive, while in a first mode, such as a DLEP mode, a command for accessing data stored at the memory device 410, such as a write command, from the host system 405 using a command channel 415. The memory device 410 may be further configured to receive, from the host system 405, data associated with the command over a data channel 420. The memory device 410 may perform an error control procedure on the command using an error control code engine 445. In some cases, the memory device 410 may include a controller (not shown) which may oversee and route various signals and data received and transmitted over channels connecting the memory device 410 and the host system 405. In some cases, the host system 405 may include a host controller 460 which may oversee and route various signals and data received and transmitted over channels connecting the memory device 410 and the host system 405.

In some cases, while in a second mode (e.g., while in a mode outside of the DLEP mode) and as part of performing an access command, such as a write command, the memory device 410 may validate the accuracy of data associated with the command received from the host system 405 by performing an error correction procedure on the data. For example, in the second mode, the host system 405 may transmit an error control code for the command (e.g., a write parity code) and an error control code for the data over a first pin, such as an error control channel 425. In some example, the error control channel may be an example of a read data strobe (Error control) channel. The memory device 410 may perform an error correction procedure on the data using the error control code for the data to detect errors, correct error, or both of the data. Additionally, the memory device 410 may perform an error control procedure on the command using the error control code for the command and the error control code engine 445. The error control code associated with the data transmitted while in the second mode may be referred to as a data link error control code or data link ECC.

In some cases, while in the second mode, the memory system may receive inversion information, such as DMI information, over an inversion channel 430. In some cases, DMI may be used to indicate whether portions of data associated with the command received from the host system 205 may be inverted Additionally or alternatively, the memory device 410 may receive an error control code for the inversion information over the error control channel 425, along with the error control codes for the command and the data. After performing the error control procedure, the memory system may store the data in an array for data, such as a data array 435.

Additionally or alternatively, the memory device 410, the host system 405, or a combination thereof may initiate the first mode. While in the first mode (e.g., while in the DLEP mode), the memory device 410 may not perform an error control procedure on the data received from the host system 405 as part of a write command. Instead, the memory device 410 may store error control codes associated with the data in an array separate from the data array 435. For example, the memory device 410 may store the error control code for the data in an error control code array 440. In some cases, the memory system may receive a second command associated with the data, such as read command for the data. In such cases, the memory device 410 may transmit the data stored in the data array 435 and the error control code stored in the error control code array 440 to the host system as part of performing the read command. The host system 405 may perform an error control procedure on the data using the error control code received from the memory device 410. For example, the host system 405 may use an error control code engine 455 to perform the error control procedure. The error control code associated with the data transmitted while in the first mode may be referred to as a host error control code data or host ECC data.

In some cases, while in the first mode, the error control code for the command may be transmitted over the error control channel 425, while the error control code for the data (e.g., the host ECC data) may be transmitted over the inversion channel 430. In such cases, the memory device 410 may not be able to receive inversion information from the host system 405, because the channel used for the inversion information may be occupied by the error control code for the data. Thus, operations using the inversion information, such as a mask write or a DBI operation, may not be performed during the first mode (e.g., DLEP mode).

Additionally or alternatively, while in the first mode, the memory system may use a same channel to receive the error control code for the command and the error control code for the data. By way of example, the memory system may receive a command, such as a write command, over the command channel 415 and data associated with the command over the data channel 420.

In some cases, the memory device 410 may use the error control channel 425 to receive both an error control code for the command and an error control code for the data. The memory device 410 may perform, for example at the error control code engine 445, an error control procedure on the command using the error control code for the command. The memory device may store the error control code for the data in the error control code array 440. In some examples, the error control code for the command may include a single bit (e.g., the error control code for the command may be an even/odd parity bit), while the error control code for the data may include eight bits.

In some cases, while in the first mode, the inversion channel 430 may be used to transmit bus inversion information, such as DBI, from the host system 405 to the memory device 410. The bus inversion information may indicate a polarity of the data. For example, the bus inversion information may indicate whether the data was inverted prior to transmission. In such cases, prior to being stored in the data array 435, the data may be inverted using a bus inversion logic 450, based on the bus inversion information. Transmitting the bus inversion information while in the first mode may thus improve the reliability of data transferred while in the first mode. Additionally or alternatively, the inversion channel 430 may be disabled while in the first mode. For example, because the error control code for the data and the error control code for the data may be transmitted over the error control channel while in the first mode, the inversion channel 430 may by unused and thus may be disabled. Disabling the inversion channel may reduce power consumption and overhead associated with monitoring the inversion channel 430.

In some cases, the memory device 410 may receive an access command, such as a read command, for the data stored in the data array 435. In such cases, the memory device 410 may retrieve the data stored in the data array 435 and the error control code for the data stored in the error control code array 440. Subsequently, the memory device 410 may transmit the data, for example using the data channel 420, to the host system 405. Additionally, the memory device 410 may transmit the error control code for the data using the error control channel 425. In some cases, the host system 405 may perform, for example at the error control code engine 455, an error control procedure on the data using the error control code for the data.

Figure 5A:
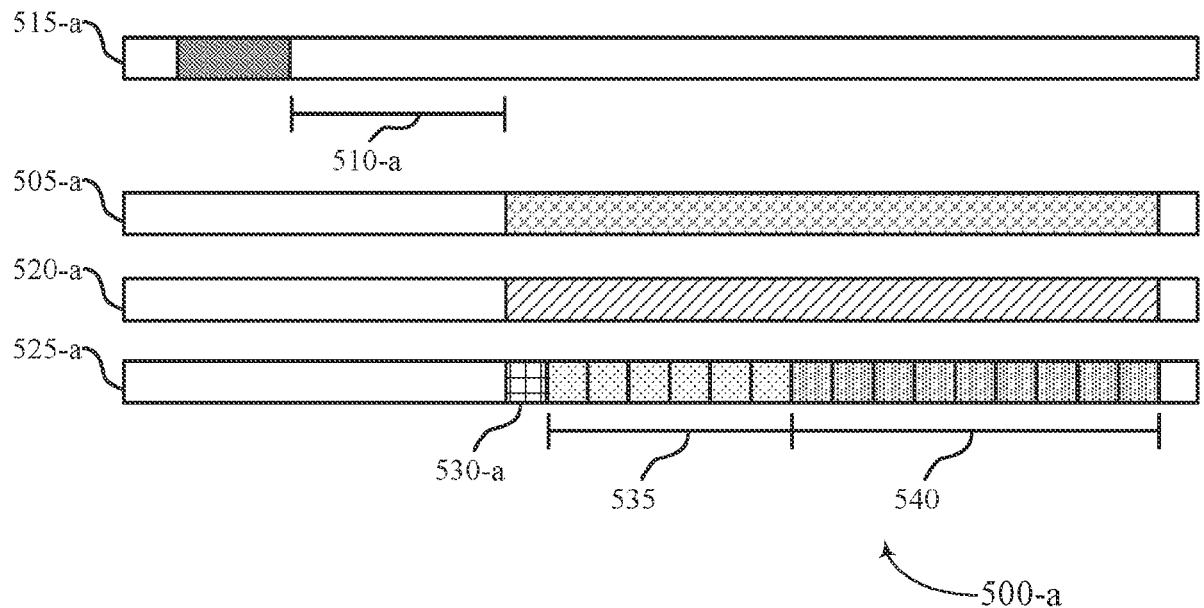
FIGS. 5A and 5B illustrate examples of a timing diagram that supports techniques for error correction at a memory device in accordance with examples as disclosed herein.
Figure 5B:
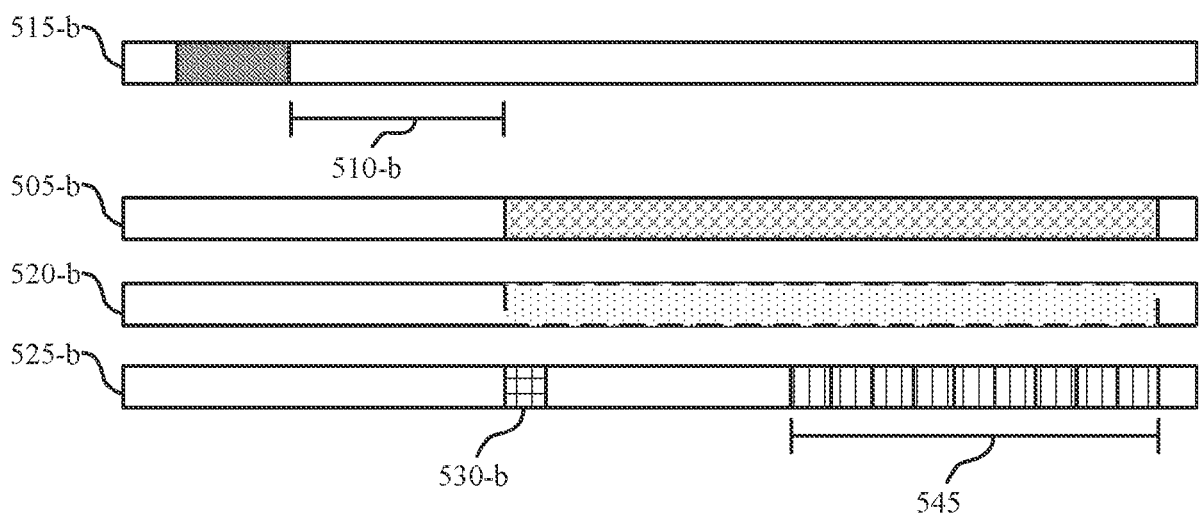
Figure 5B:
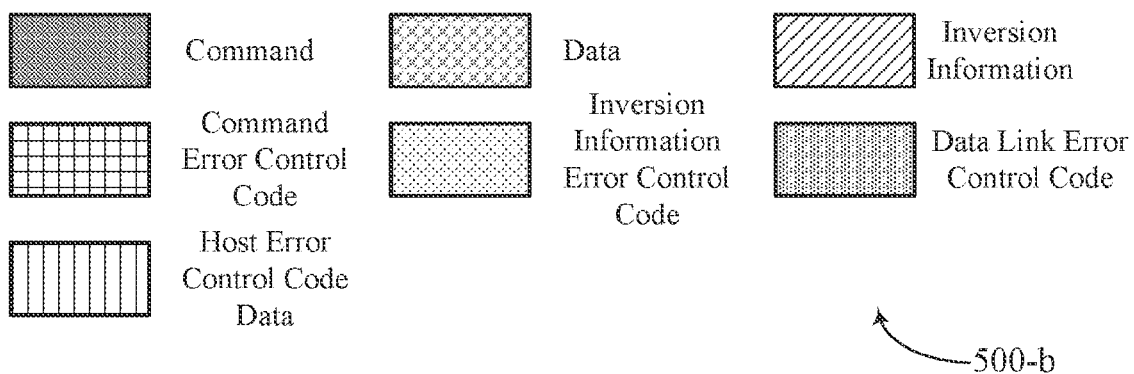

FIGS. 5A and 5B illustrate examples of a timing diagram 500-*a* and a timing diagram 500-*b* that support techniques for error correction at a memory device in accordance with examples as disclosed herein. The timing diagrams 500-*a* and 500-*b* may illustrate the timing and relative size of signals transmitted between a host system and a memory device, such as the host system 405 and the memory device 410 described with reference to FIG. 4. The timing diagrams 500-*a* and 500-*b* may include signals sent over one or more channels, such as command channels 515-*a* and 515-*b*, data channels 505-*a* and 505-*b*, inversion channels 520-*a* and 520-*b*, and error control channels 525-*a* and 525-*b*.

FIG. 5A illustrates an example of the timing of signals sent as part of a write command outside of a DLEP mode (e.g., while in the second mode, as described with reference to FIG. 4). By way of example, the host system may transmit a command, such as a write command, over the command channel 515-*a* to the memory device. After a duration 510-*a* (e.g., a write latency), the host system may transmit data associated with the command over the data channel 505-*a*. Additionally, the host system may transmit inversion information, such as DMI, over the inversion channel 520-*a*. In some cases, the host system may transmit one or more error control codes over the error control channel 525-*b*. For example, the host system may transmit a command error control code 530-*a* corresponding to the transmitted command, such as a write parity bit. While outside the DLEP mode, the host system may transmit an error control code for the inversion information 535. Additionally, while outside the DLEP mode, the host system may transmit an error control code for the data, such as a data link error control code 540. The data link error control code 540 may be configured to be used by the memory system to perform an error control procedure at the memory device on the data transmitted over the data channel 505-*a* before storing the data in the memory array.

FIG. 5B illustrates an example of the timing of signals sent as part of a write command while in a DLEP mode (e.g., while in the first mode, as described with reference to FIG. 4). By way of example, the host system may transmit a command, such as a write command, over the command channel 515-*b* to the memory device. After a duration 510-*b* (e.g., a write latency), the host system may transmit data associated with the command over the data channel 505-*b*. In some cases, the host system may transmit one or more error control codes over the error control channel 525-*b*. For example, the host system may transmit a command error control code 530-*b* corresponding to the transmitted command, such as a write parity bit. In some cases, the command error control code may be expanded to include more than one bit, so that the command error control code may be configured to detect errors, correct errors, or both in the command.

While in the DLEP mode, the host system may transmit an error control code for the data, such as a host error control code 545. The host error control code 545 may be configured to be stored by the memory system in an array separate from an array used to store data received over the data channel 505-*b*. The host error control code 545 may be retrieved and transmitted back to the host system as part of a read operation for the data. In some cases, while in the DLEP mode, the host system may transmit bus inversion information, such as DBI, over the inversion channel 520-*b*. Additionally or alternatively, the inversion channel 520-*b* may be disabled while in the DLEP mode.

Figure 6:
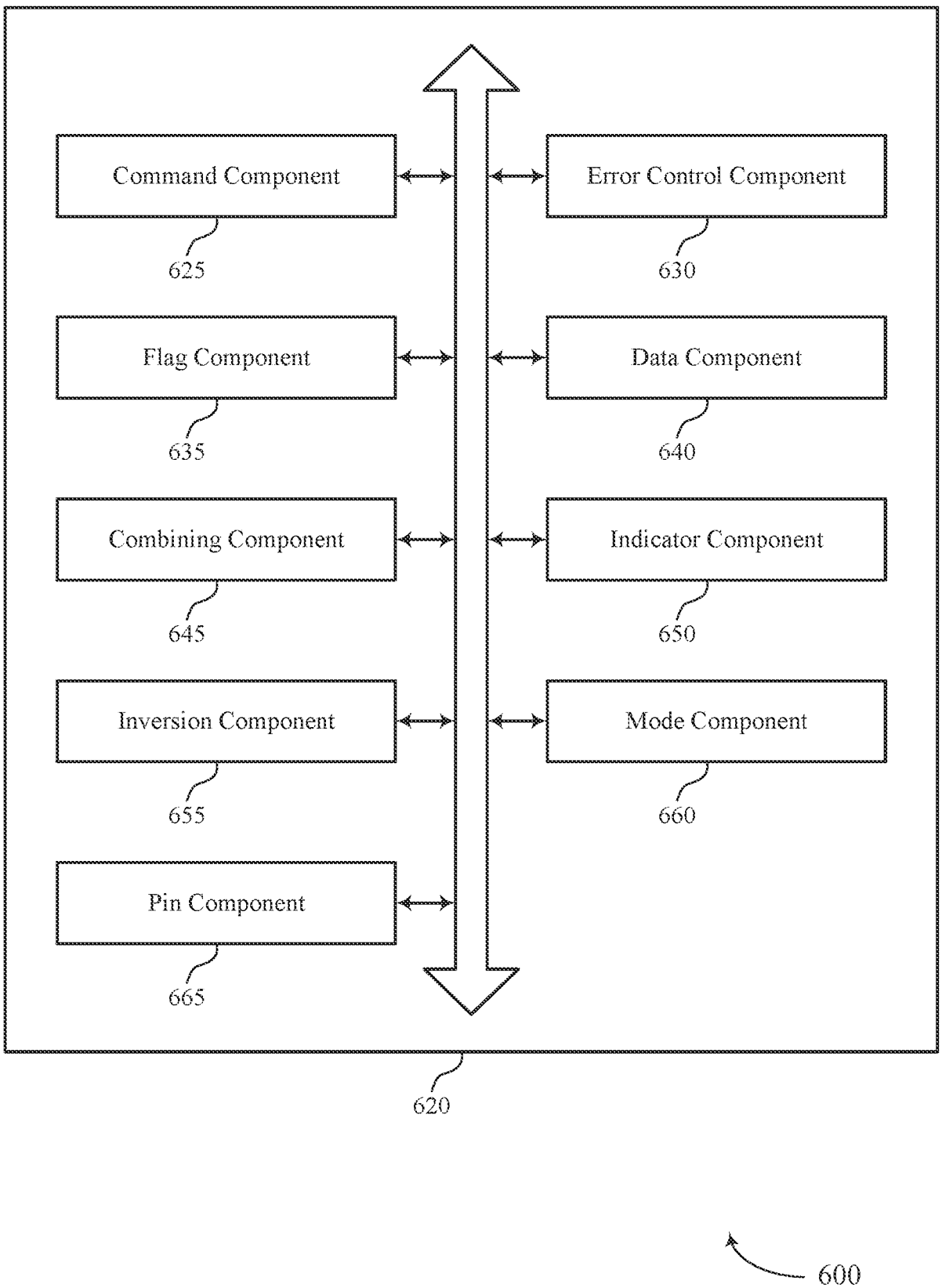
FIG. 6 shows a block diagram of a memory system that supports techniques for error correction at a memory device in accordance with examples as disclosed herein.

FIG. 6 shows a block diagram 600 of a memory system 620 that supports techniques for error correction at a memory device in accordance with examples as disclosed herein. The memory system 620 may be an example of aspects of a memory system as described with reference to FIGS. 1 through 5B. The memory system 620, or various components thereof, may be an example of means for performing various aspects of techniques for error correction at a memory device as described herein. For example, the memory system 620 may include a command component 625, an error control component 630, a flag component 635, a data component 640, a combining component 645, an indicator component 650, an inversion component 655, a mode component 660, a pin component 665, or any combination thereof. Each of these components may communicate, directly or indirectly, with one another (e.g., via one or more buses).

The command component 625 may be configured as or otherwise support a means for receiving, from a host device, a command for accessing a memory device, inversion information different than data associated with the command, and a first error control code associated with the inversion information and the command. The error control component 630 may be configured as or otherwise support a means for performing an error control procedure on the command and the inversion information using the first error control code associated with the command and the inversion information. The flag component 635 may be configured as or otherwise support a means for setting a flag of the memory device indicating a status of the error control procedure based at least in part on performing the error control procedure.

In some examples, to support performing the error control procedure, the error control component 630 may be configured as or otherwise support a means for generating a second error control code using the command and the inversion information. In some examples, to support performing the error control procedure, the error control component 630 may be configured as or otherwise support a means for determining whether the first error control code matches the second error control code based at least in part on generating the second error control code.

In some examples, the combining component 645 may be configured as or otherwise support a means for combining the command with the inversion information based at least in part on receiving the inversion information and the command, where performing the error control procedure is based at least in part on the combining.

In some examples, the first error control code includes one or more error correction bits for the inversion information and one or more error correction bits for the command.

In some examples, the error control component 630 may be configured as or otherwise support a means for detecting, based at least in part on performing the error control procedure, at least one error in the inversion information and the command. In some examples, the error control component 630 may be configured as or otherwise support a means for correcting the at least one error in the inversion information and the command based at least in part on the detecting.

In some examples, the command component 625 may be configured as or otherwise support a means for performing the command based at least in part on setting the flag, where the flag indicates that the error control procedure did not detect an error in the command, the inversion information, or both.

In some examples, the command component 625 may be configured as or otherwise support a means for storing the command for a duration prior to receiving the first error control code, where performing the error control procedure is based at least in part on storing the command.

In some examples, the inversion information is received as part of a write burst. In some examples, the error control procedure includes a SECDED procedure. In some examples, the error control procedure is performed by an error control engine of the memory device.

In some examples, the indicator component 650 may be configured as or otherwise support a means for transmitting, as part of a read command, an indicator to the host device to read a mode register that stores the flag, where the flag indicates that the error control procedure detected two or more errors in the command, the inversion information, or both.

In some examples, the pin component 665 may be configured as or otherwise support a means for adjusting a voltage of one or more pins between the host device and the memory device based at least in part on transmitting the indicator.

In some examples, the error control component 630 may be configured as or otherwise support a means for receiving, from a host device over a first pin during a first mode of a memory device, a first error control code associated with a command for accessing the memory device and a second error control code associated with data to be stored in the memory device. The data component 640 may be configured as or otherwise support a means for receiving, from the host device over a second pin, the data to be stored in the memory device. In some examples, the error control component 630 may be configured as or otherwise support a means for performing an error control procedure on the command using the first error control code. In some examples, the error control component 630 may be configured as or otherwise support a means for storing the second error control code in a first memory array of the memory device.

In some examples, the data component 640 may be configured as or otherwise support a means for storing the data in a second memory array of the memory device based at least in part on storing the second error control code in the first memory array of the memory device.

In some examples, the error control component 630 may be configured as or otherwise support a means for retrieving the second error control code from the first memory array based at least in part on storing the second error control code from the first memory array. In some examples, the data component 640 may be configured as or otherwise support a means for retrieving the data from the second memory array based at least in part on storing the data in the second memory array.

In some examples, the error control component 630 may be configured as or otherwise support a means for transmitting the second error control code to the host device over the first pin based at least in part on retrieving the second error control code from the first memory array. In some examples, the data component 640 may be configured as or otherwise support a means for transmitting the data to the host device over the second pin based at least in part on retrieving the data from the second memory array.

In some examples, the inversion component 655 may be configured as or otherwise support a means for receiving, over a third pin, bus inversion information, where the third pin is configured to carry the bus inversion information in the first mode.

In some examples, the mode component 660 may be configured as or otherwise support a means for initiating a DLEP mode, the DLEP mode to disable a link error control code and an array error control code, where the first mode includes the DLEP mode different than a second mode.

In some examples, the second error control code includes an error control code configured for the host device to perform a second error control procedure on the data after the data has been retrieved from the memory device.

Figure 7:
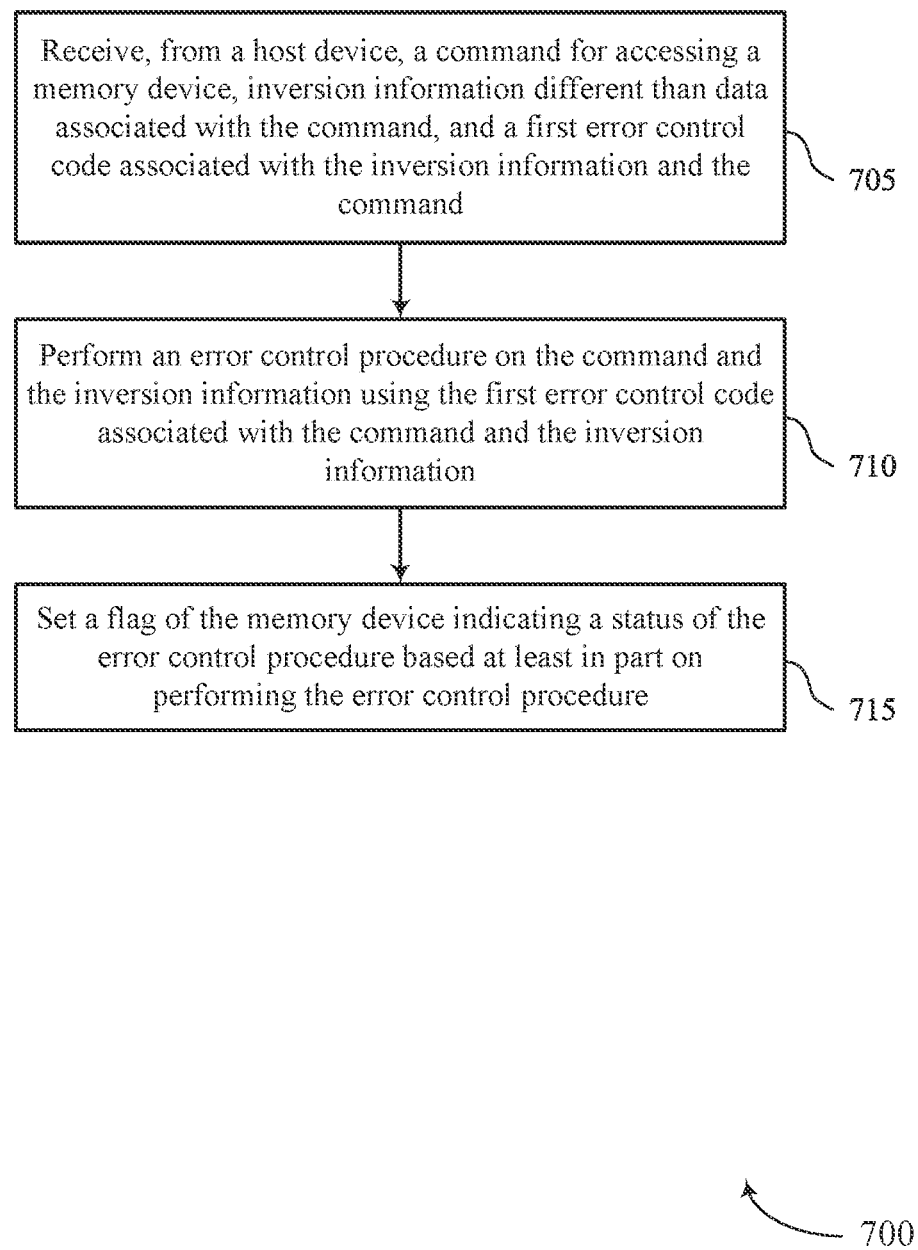
FIGS. 7 and 8 show flowcharts illustrating a method or methods that support techniques for error correction at a memory device in accordance with examples as disclosed herein.

FIG. 7 shows a flowchart illustrating a method 700 that supports techniques for error correction at a memory device in accordance with examples as disclosed herein. The operations of method 700 may be implemented by a memory system or its components as described herein. For example, the operations of method 700 may be performed by a memory system as described with reference to FIGS. 1 through 6. In some examples, a memory system may execute a set of instructions to control the functional elements of the device to perform the described functions. Additionally or alternatively, the memory system may perform aspects of the described functions using special-purpose hardware.

At 705, the method may include receiving, from a host device, a command for accessing a memory device, inversion information different than data associated with the command, and a first error control code associated with the inversion information and the command. The operations of 705 may be performed in accordance with examples as disclosed herein. In some examples, aspects of the operations of 705 may be performed by a command component 625 as described with reference to FIG. 6.

At 710, the method may include performing an error control procedure on the command and the inversion information using the first error control code associated with the command and the inversion information. The operations of 710 may be performed in accordance with examples as disclosed herein. In some examples, aspects of the operations of 710 may be performed by an error control component 630 as described with reference to FIG. 6.

At 715, the method may include setting a flag of the memory device indicating a status of the error control procedure based at least in part on performing the error control procedure. The operations of 715 may be performed in accordance with examples as disclosed herein. In some examples, aspects of the operations of 715 may be performed by a flag component 635 as described with reference to FIG. 6.

In some examples, an apparatus as described herein may perform a method or methods, such as the method 700. The apparatus may include, features, circuitry, logic, means, or instructions (e.g., a non-transitory computer-readable medium storing instructions executable by a processor), or any combination thereof for performing the following aspects of the present disclosure:

Aspect 1: The apparatus, including features, circuitry, logic, means, or instructions, or any combination thereof for receiving, from a host device, a command for accessing a memory device, inversion information different than data associated with the command, and a first error control code associated with the inversion information and the command; performing an error control procedure on the command and the inversion information using the first error control code associated with the command and the inversion information; and setting a flag of the memory device indicating a status of the error control procedure based at least in part on performing the error control procedure.

Aspect 2: The apparatus of aspect 1 where performing the error control procedure, further includes operations, features, circuitry, logic, means, or instructions, or any combination thereof for generating a second error control code using the command and the inversion information and determining whether the first error control code matches the second error control code based at least in part on generating the second error control code.

Aspect 3: The apparatus of any of aspects 1 through 2, further including operations, features, circuitry, logic, means, or instructions, or any combination thereof for combining the command with the inversion information based at least in part on receiving the inversion information and the command, where performing the error control procedure is based at least in part on the combining.

Aspect 4: The apparatus of any of aspects 1 through 3, further including operations, features, circuitry, logic, means, or instructions, or any combination thereof for the first error control code includes one or more error correction bits for the inversion information and one or more error correction bits for the command.

Aspect 5: The apparatus of any of aspects 1 through 4, further including operations, features, circuitry, logic, means, or instructions, or any combination thereof for detecting, based at least in part on performing the error control procedure, at least one error in the inversion information and the command and correcting the at least one error in the inversion information and the command based at least in part on the detecting.

Aspect 6: The apparatus of any of aspects 1 through 5, further including operations, features, circuitry, logic, means, or instructions, or any combination thereof for performing the command based at least in part on setting the flag, where the flag indicates that the error control procedure did not detect an error in the command, the inversion information, or both.

Aspect 7: The apparatus of any of aspects 1 through 6, further including operations, features, circuitry, logic, means, or instructions, or any combination thereof for storing the command for a duration prior to receiving the first error control code, where performing the error control procedure is based at least in part on storing the command.

Aspect 8: The apparatus of any of aspects 1 through 7, further including operations, features, circuitry, logic, means, or instructions, or any combination thereof for the inversion information is received as part of a write burst.

Aspect 9: The apparatus of any of aspects 1 through 8, further including operations, features, circuitry, logic, means, or instructions, or any combination thereof for the error control procedure includes a SECDED procedure.

Aspect 10: The apparatus of any of aspects 1 through 9, further including operations, features, circuitry, logic, means, or instructions, or any combination thereof for the error control procedure is performed by an error control engine of the memory device.

Aspect 11: The apparatus of any of aspects 1 through 10, further including operations, features, circuitry, logic, means, or instructions, or any combination thereof for transmitting, as part of a read command, an indicator to the host device to read a mode register that stores the flag, where the flag indicates that the error control procedure detected two or more errors in the command, the inversion information, or both.

Aspect 12: The apparatus of aspect 11, further including operations, features, circuitry, logic, means, or instructions, or any combination thereof for adjusting a voltage of one or more pins between the host device and the memory device based at least in part on transmitting the indicator.

Figure 8:
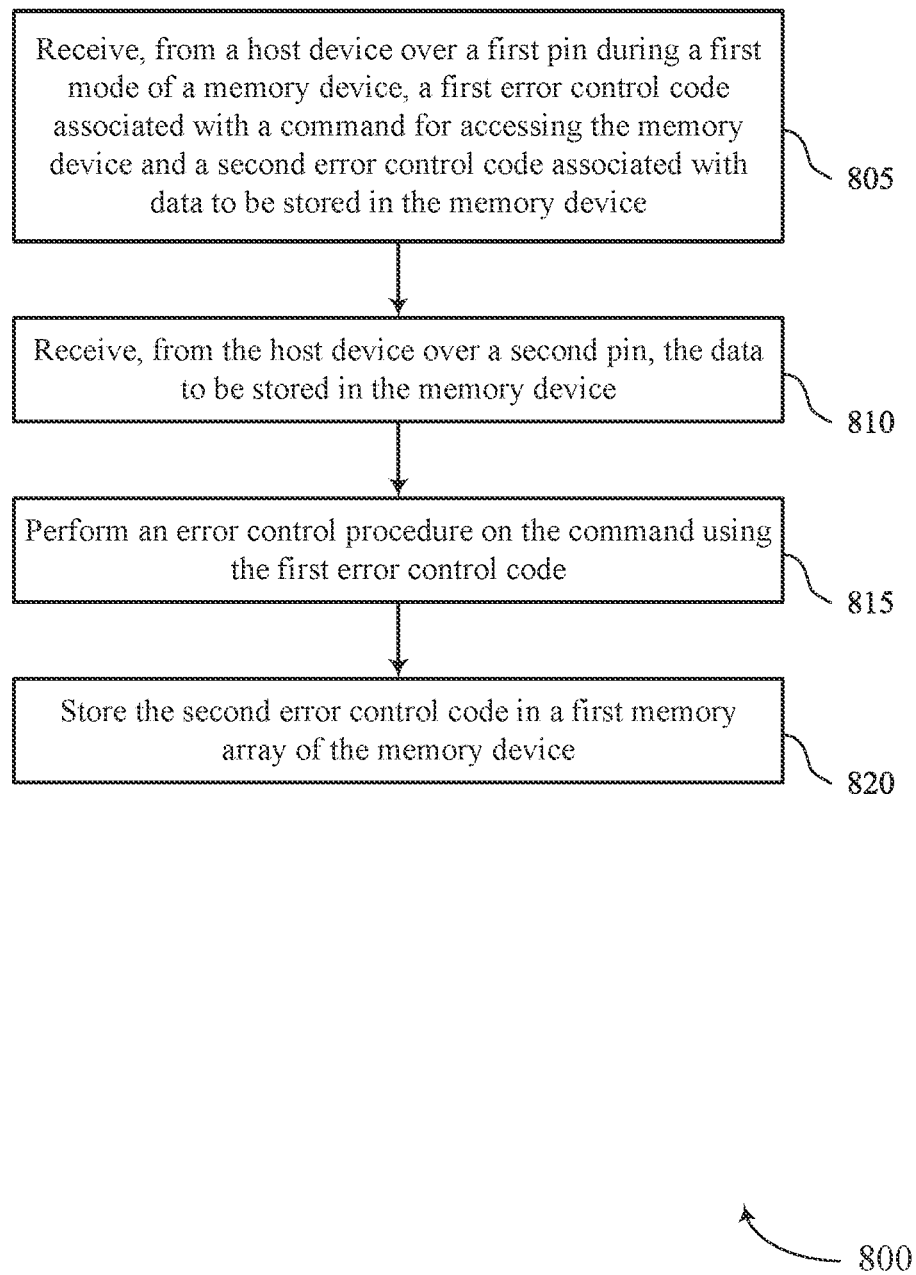

FIG. 8 shows a flowchart illustrating a method 800 that supports techniques for error correction at a memory device in accordance with examples as disclosed herein. The operations of method 800 may be implemented by a memory system or its components as described herein. For example, the operations of method 800 may be performed by a memory system as described with reference to FIGS. 1 through 6. In some examples, a memory system may execute a set of instructions to control the functional elements of the device to perform the described functions. Additionally or alternatively, the memory system may perform aspects of the described functions using special-purpose hardware.

At 805, the method may include receiving, from a host device over a first pin during a first mode of a memory device, a first error control code associated with a command for accessing the memory device and a second error control code associated with data to be stored in the memory device. The operations of 805 may be performed in accordance with examples as disclosed herein. In some examples, aspects of the operations of 805 may be performed by an error control component 630 as described with reference to FIG. 6.

At 810, the method may include receiving, from the host device over a second pin, the data to be stored in the memory device. The operations of 810 may be performed in accordance with examples as disclosed herein. In some examples, aspects of the operations of 810 may be performed by a data component 640 as described with reference to FIG. 6.

At 815, the method may include performing an error control procedure on the command using the first error control code. The operations of 815 may be performed in accordance with examples as disclosed herein. In some examples, aspects of the operations of 815 may be performed by an error control component 630 as described with reference to FIG. 6.

At 820, the method may include storing the second error control code in a first memory array of the memory device. The operations of 820 may be performed in accordance with examples as disclosed herein. In some examples, aspects of the operations of 820 may be performed by an error control component 630 as described with reference to FIG. 6.

In some examples, an apparatus as described herein may perform a method or methods, such as the method 800. The apparatus may include, features, circuitry, logic, means, or instructions (e.g., a non-transitory computer-readable medium storing instructions executable by a processor), or any combination thereof for performing the following aspects of the present disclosure:

Aspect 13: The apparatus, including features, circuitry, logic, means, or instructions, or any combination thereof for receiving, from a host device over a first pin during a first mode of a memory device, a first error control code associated with a command for accessing the memory device and a second error control code associated with data to be stored in the memory device; receiving, from the host device over a second pin, the data to be stored in the memory device; performing an error control procedure on the command using the first error control code; and storing the second error control code in a first memory array of the memory device.

Aspect 14: The apparatus of aspect 13, further including operations, features, circuitry, logic, means, or instructions, or any combination thereof for storing the data in a second memory array of the memory device based at least in part on storing the second error control code in the first memory array of the memory device.

Aspect 15: The apparatus of aspect 14, further including operations, features, circuitry, logic, means, or instructions, or any combination thereof for retrieving the second error control code from the first memory array based at least in part on storing the second error control code from the first memory array and retrieving the data from the second memory array based at least in part on storing the data in the second memory array.

Aspect 16: The apparatus of aspect 15, further including operations, features, circuitry, logic, means, or instructions, or any combination thereof for transmitting the second error control code to the host device over the first pin based at least in part on retrieving the second error control code from the first memory array and transmitting the data to the host device over the second pin based at least in part on retrieving the data from the second memory array.

Aspect 17: The apparatus of any of aspects 13 through 16, further including operations, features, circuitry, logic, means, or instructions, or any combination thereof for receiving, over a third pin, bus inversion information, where the third pin is configured to carry the bus inversion information in the first mode.

Aspect 18: The apparatus of any of aspects 13 through 17, further including operations, features, circuitry, logic, means, or instructions, or any combination thereof for initiating a DLEP mode, the DLEP mode to disable a link error control code and an array error control code, where the first mode includes the DLEP mode different than a second mode.

Aspect 19: The apparatus of any of aspects 13 through 18, further including operations, features, circuitry, logic, means, or instructions, or any combination thereof for the second error control code includes an error control code configured for the host device to perform a second error control procedure on the data after the data has been retrieved from the memory device.

It should be noted that the methods described herein describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
   receiving, from a host device, a command for accessing a memory device, inversion information different than data associated with the command, and a first error control code associated with the inversion information and the command;
   performing an error control procedure on the command and the inversion information using the first error control code associated with the command and the inversion information; and
   setting a flag of the memory device indicating a status of the error control procedure based at least in part on performing the error control procedure.

2. The method of claim 1, wherein performing the error control procedure further comprises:
   generating a second error control code using the command and the inversion information; and
   determining whether the first error control code matches the second error control code based at least in part on generating the second error control code.

3. The method of claim 1, further comprising:
   combining the command with the inversion information based at least in part on receiving the inversion information and the command, wherein performing the error control procedure is based at least in part on the combining.

4. The method of claim 1, wherein the first error control code comprises one or more error correction bits for the inversion information and one or more error correction bits for the command.

5. The method of claim 1, further comprising:
detecting, based at least in part on performing the error control procedure, at least one error in the inversion information and the command; and
correcting the at least one error in the inversion information and the command based at least in part on the detecting.

6. The method of claim 1, further comprising:
performing the command based at least in part on setting the flag, wherein the flag indicates that the error control procedure did not detect an error in the command, the inversion information, or both.

7. The method of claim 1, further comprising:
storing the command for a duration prior to receiving the first error control code, wherein performing the error control procedure is based at least in part on storing the command.

8. The method of claim 1, wherein the inversion information is received as part of a write burst.

9. The method of claim 1, wherein the error control procedure comprises a single error correction double error detection (SECDED) procedure.

10. The method of claim 1, wherein the error control procedure is performed by an error control engine of the memory device.

11. The method of claim 1, further comprising:
transmitting, as part of a read command, an indicator to the host device to read a mode register that stores the flag, wherein the flag indicates that the error control procedure detected two or more errors in the command, the inversion information, or both.

12. The method of claim 11, further comprising:
adjusting a voltage of one or more pins between the host device and the memory device based at least in part on transmitting the indicator.

13. A method, comprising:
receiving, from a host device over a first pin during a first mode of a memory device, a first error control code associated with a command for accessing the memory device and a second error control code associated with data to be stored in the memory device;
receiving, from the host device over a second pin, the data to be stored in the memory device;
performing an error control procedure on the command using the first error control code; and
storing the second error control code in a first memory array of the memory device.

14. The method of claim 13, further comprising:
storing the data in a second memory array of the memory device based at least in part on storing the second error control code in the first memory array of the memory device.

15. The method of claim 14, further comprising:
retrieving the second error control code from the first memory array based at least in part on storing the second error control code from the first memory array; and
retrieving the data from the second memory array based at least in part on storing the data in the second memory array.

16. The method of claim 15, further comprising:
transmitting the second error control code to the host device over the first pin based at least in part on retrieving the second error control code from the first memory array; and
transmitting the data to the host device over the second pin based at least in part on retrieving the data from the second memory array.

17. The method of claim 13, further comprising:
receiving, over a third pin, bus inversion information, wherein the third pin is configured to carry the bus inversion information in the first mode.

18. The method of claim 13, further comprising:
initiating a direct link error correction code procedure (DLEP) mode, the DLEP mode to disable a link error control code and an array error control code, wherein the first mode comprises the DLEP mode different than a second mode.

19. The method of claim 13, wherein the second error control code comprises an error control code configured for the host device to perform a second error control procedure on the data after the data has been retrieved from the memory device.

20. An apparatus, comprising: a controller associated with a memory device, wherein the controller is configured to cause the apparatus to:
receive, from a host device, a command for accessing the memory device, inversion information different than data associated with the command, and a first error control code associated with the inversion information and the command;
perform an error control procedure on the command and the inversion information using the first error control code associated with the command and the inversion information; and
set a flag of the memory device indicating a status of the error control procedure based at least in part on performing the error control procedure.

* * * * *